A. DEISS.
PROCESS FOR THE MANUFACTURE OF OXALIC ACID AND OTHER OXYGENATED CARBON PRODUCTS.
APPLICATION FILED SEPT. 4, 1909.
999,551. Patented Aug. 1, 1911.
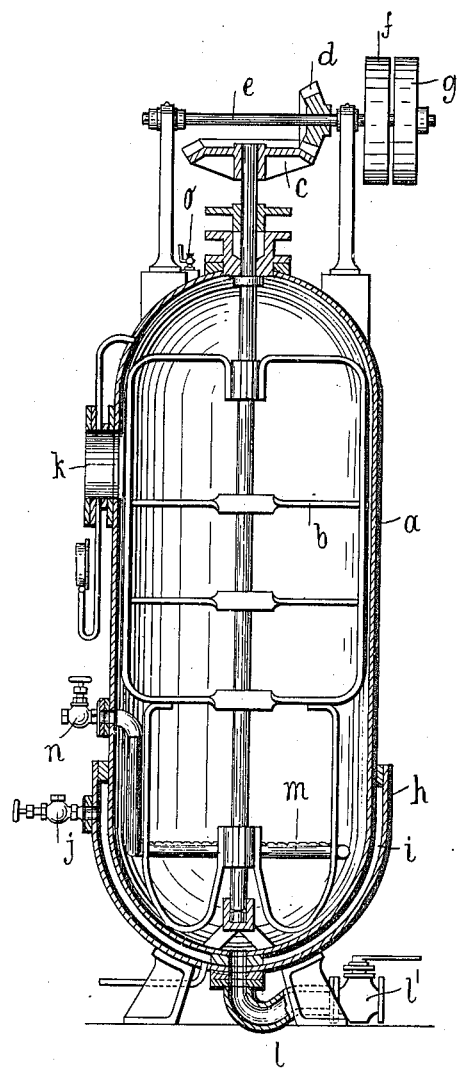

UNITED STATES PATENT OFFICE.

AUGUSTE DEISS, OF MARSEILLE, FRANCE.

PROCESS FOR THE MANUFACTURE OF OXALIC ACID AND OTHER OXYGENATED CARBON PRODUCTS.

999,551. Specification of Letters Patent. Patented Aug. 1, 1911.

Application filed September 4, 1909. Serial No. 516,277.

*To all whom it may concern:*

Be it known that I, AUGUSTE DEISS, a citizen of the Republic of France, residing at Marseille, in the Republic of France, have invented a new and useful Improvement in Processes for the Manufacture of Oxalic Acid and other Oxygenated Carbon Products, of which the following is a specification.

My invention consists of a process for the manufacture of oxalic acid and other oxygenated carbon products from the waste of wood paper-pulp and like pulps derived from other fibrous materials, also from the waste of plants and from the plants themselves, by the simultaneous action of superheated steam under pressure and of more or less concentrated alkalis.

Broadly speaking, the process consists in subjecting simultaneously the vegetable material to the oxidizing action of air free superheated steam operating under pressure, and to the action of more or less concentrated caustic alkalis, likewise heated.

In the accompanying drawings, the figure represents in cross section an apparatus which may be used for carrying out my process.

The form of apparatus shown in the drawing is illustrative merely, as a great many different forms might be devised for accomplishing the same result.

*a* represents a shell, within which is a stirrer *b*, which is operated by means of beveled gear wheels *c* and *d* driven from a main shaft *e*, which is provided with fast and loose pulleys *f* and *g*. The lower part of the shell or casing *a* is surrounded by a jacket *h*, leaving the space *i* between the jacket and shell, into which superheated steam may be introduced, the flow of the steam being regulated by a valve *j*. The shell is also provided with an inlet *k* for the material to be treated and with an outlet pipe *l*, provided with a valve *l'*. Inside the shell *a* is arranged a perforated coiled pipe *m*, through which superheated steam may be introduced into the inside of the vessel or shell *a*, the flow of the steam being controlled by the valve *n*.

*o* is an air valve, fitted at the top of the vessel *a*, for allowing air to escape and rendering it possible that the mass shall be thoroughly stirred by the passage of the steam into the vessel through the perforated pipe *m*.

For the purpose of simultaneously subjecting the material to the oxidizing action of superheated steam operating under pressure, and of more or less concentrated caustic alkalis, also highly heated, the alkaline liquors resulting from paper pulps after separating the cellulose and containing the organic matter to be treated, are concentrated to say from 35 to 40 degrees Baumé. In the case of other materials, the same are previously dissolved in a strong alkali for the purpose of liquefying them, after which the mass is brought to a concentration of from say 35 to 40 degrees Baumé. When this has been done, the liquor thus obtained is then forced, by means of a pump, into a digester which is preferably heated externally and internally, under pressure, by means of superheated steam which may be conveniently produced in a cast-iron superheater acted on by direct heat. To this end, the said superheated steam may be on the one hand, caused to flow through a jacket surrounding the apparatus and, at the same time, the said steam may be, on the other hand, injected into the mass itself contained in the said apparatus. By this means, a two-fold effect is produced, viz: a heating effect by the dry heat, without any risk of charring the material and, simultaneously, a heating effect and a direct stirring effect of the mass by means of the superheated steam.

At its top, the apparatus may be provided with an air vent enabling the air to escape while the mass is stirred owing to the passage through it of the steam injected thereinto, and this stirring is found particularly effective in promoting oxidation.

In the case of the production of oxalic acid, the temperature may be increased up to say 220 to 230 degrees centigrade. In the case of the manufacture of other vegetable acids, lower temperatures may be employed. A stationary thermometer may be used to enable the operation to be easily controlled.

The oxidizing and readily controlled action of superheated steam prevents charring and the absence of air prevents the formation of carbonates. Further, the employment of steam enables graduated and controllable effects to be obtained, in contradistinction to the methods carried on with an open fire, as has been hitherto practiced. I am, therefore, enabled by means of my oxidizing process employing superheated steam in a closed vessel, to completely recover the alkalis without experiencing any carbonaceous charring of the material acted on. In this manner, a great saving of alkali is effected, for the latter simply constitutes a means for effecting the oxidation and may be fully recovered at a low cost. On the other hand, in the methods hitherto practiced for recovering the original liquor of the soda or other alkali employed, carbonates were formed of the whole of the soda or other alkali. Again, the process herein described makes it possible to only neutralize a quantity of alkali proportionate to the quantity of organic material treated, the said material being converted into vegetable acids while the alkali may be recovered in an almost colorless condition as caustic alkali, and this latter may of course in that condition, be used over again in fresh operations. Finally, the stirring or agitation produced by the injection of superheated steam into the mass under treatment obviates the drawback of an insufficient mechanical agitation which has been hitherto found to exist in open fire processes.

The recovery of the alkalis employed may be conveniently effected by means of lime by a substitution process, in steam vessels provided with agitators. In such a process, owing to the double decomposition of the organic acid salts, insoluble lime salts are formed which can be treated by the usual methods, as for example, by means of sulfuric acid or the like.

As a specific example, the process may be carried out as follows, it being assumed that it is to be applied to the treatment of straw for manufacturing oxalic acid: 1,000 kilograms of straw are finely divided by any suitable means, such as chopping it up, and then treated, in a closed vessel, with about 5,000 liters of a strong alkaline solution, such as soda lye, at about 12° Baumé, which solution would then contain about 500 kilos. of caustic soda at 70 per cent. The mass is then simultaneously subjected to the action of superheated steam at about 150° C., and a pressure of about 5 kilos. per square centimeter. After three hours of such treatment, the superheated steam has reduced into an alkaline syrup about one-half or two-thirds of the raw material, that is to say, the more soluble portions of such material, such as cutose, pectocellulose and vasculose. This solution is then drawn off, leaving as a residuum in the tank pure and fibrous cellulose, which may be washed and used for any of the well known purposes to which cellulose may be applied. I then concentrate, the drawn-off liquor up to about 35 degrees Baumé, preferably employing a vacuum. After concentration, I lead into the apparatus through the inlet $k$ the alkaline solution of organic matter. I may, for instance, for 1000 liters of liquor leaving the concentrating evaporator, take 1600 kgs. of caustic soda at 70 per cent. and from 155 to 160 kgs. of anhydrous potash. I inject into the mass contained in the apparatus through the pipe $m$, superheated steam at about 200 to 220° C. and at the same time I cause superheated steam to enter the space $i$ through the valve $j$, in order to keep the temperature constant. After about two hours' treatment, the mass is converted into a solution of oxalates in an alkaline solution and the alkali has not been destroyed. I then precipitate the soluble oxalates, adding enough water to bring the liquor down to 30 degrees Baumé. The excess of alkaline liquor may be re-used for subsequent operations, after concentrating it to the proper degree according to working requirements, i. e. to the degree required for lixiviation and oxidation. I then add to the crystallized oxalates a sufficient quantity of lime water. This may be prepared with about 75 kgs. of lime for 1000 liters of water. This frees the caustic soda and forms an insoluble oxalate of lime which can then be treated with sulfuric acid according to the usual methods for obtaining oxalic acid.

The yield of oxalic acid obtained by this process is about 29.5 per cent.

What I claim is:—

1. The steps in the process of manufacturing compounds containing oxygen and carbon from organic waste material which consists in subjecting said material to the simultaneous action of a concentrated alkali and superheated steam free from air, substantially as described.

2. The steps in the process of producing acid compounds containing carbon and oxygen from organic material which consists in subjecting said material in a closed vessel to the simultaneous action of heat, superheated steam free from air and to a concentrated alkali, substantially as described.

3. The steps in the process of producing organic acids from pulp liquors which consists in concentrating said liquors; and subjecting the same to the simultaneous action of heat, superheated steam free from air and concentrated alkalis, substantially as described.

4. The steps in the process of producing oxalic acid from pulp liquors which consists in concentrating said liquors without charring; and subjecting said concentrated liquors while agitating the same to the simultaneous action of heat, superheated steam free from air, and concentrated alkalis, substantially as described.

5. The steps in the process of producing organic acids which consists in dissolving plant material in an alkali; separating out the cellulose of said material; concentrating the liquors thus obtained, and subjecting the said liquors to a simultaneous agitation and heating action in the presence of superheated steam free from air and a concentrated alkali, substantially as described.

6. The steps in the process of producing organic acids from plant material which consists in dissolving said material in an alkali; separating out the cellulose contained in said material; concentrating the liquors thus obtained; subjecting said liquors to a heating action while agitating the same, simultaneously subjecting said liquors to the action of superheated steam free from air and a concentrated alkali; and in suitably separating the acid salts thus formed from the remaining alkali, substantially as described.

In witness whereof I have hereunto set my hand this 25th day of August one thousand nine hundred and nine, in presence of two subscribing witnesses.

AUGUSTE DEISS.

Witnesses:
HANSON C. COXE,
MAURICE H. PIGNET.